April 30, 1963  KUNIICHI NAGATA ET AL  3,087,989
VOWEL SYNTHESIZER
Filed Feb. 23, 1960  2 Sheets-Sheet 1

Inventors
*N. NAGATA*
*K. OBARA*
By *C. H. Suydam*
AGENT

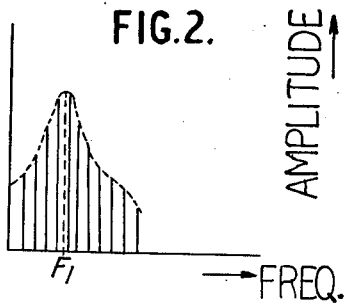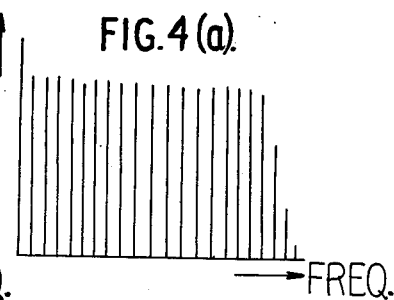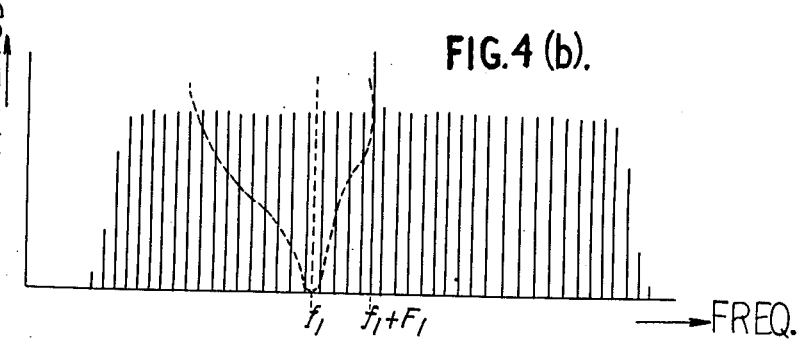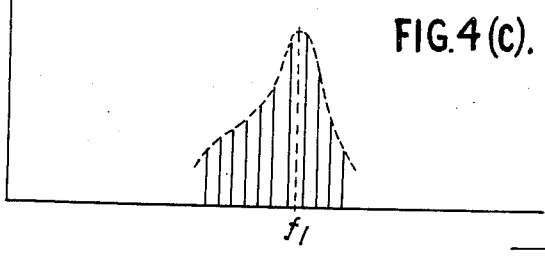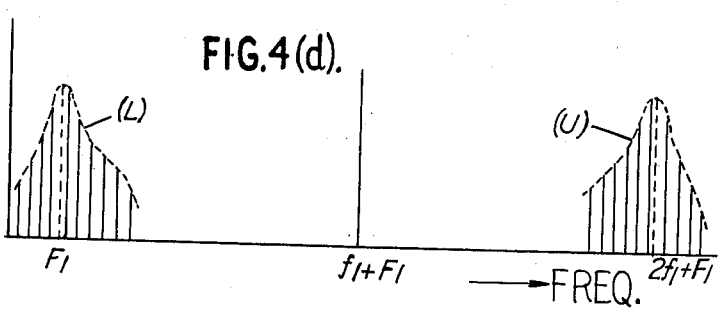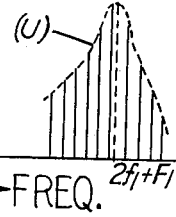

3,087,989
VOWEL SYNTHESIZER

Kuniichi Nagata and Kiyoshi Obara, Tokyo, Japan, assignors to Nippon Electric Company, Limited, Tokyo, Japan, a corporation of Japan
Filed Feb. 23, 1960, Ser. No. 10,393
Claims priority, application Japan Feb. 24, 1959
4 Claims. (Cl. 179—1)

This invention relates to vowel synthesizers and more particularly to a device for synthetically composing a vowel by applying to the device control signals which represent the pitch of the vowel, the center frequencies of the formants of the vowel, and the amplitudes of the formants at their respective center frequencies.

As is well known, it is effective and advantageous, in transmitting vowels through electrical communication systems, to make use of signals of the type mentioned in the preceding paragraph. Formant coding devices have already been disclosed, for instance, by James L. Flanagan in the Journal of the Acoustical Society of America, 1956, January, p. 110 et seq., and November, p. 1099 et seq. Vowel synthesizers of such devices comprise (1) means for producing a series of pulses having a repetition frequency equal to the frequency of the vocal chord used in forming the vowel, (2) several electrical resonators the resonance frequencies of which can be made equal to the center frequencies of the formants of the vowel by adjusting either or both the inductance and the capacity in the respective resonators and to which the series of pulses are sent to produce thereat the respective resonance oscillations and (3), means for composing the resonance oscillations so as to produce a sound similar to the vowel.

It has been known, on the other hand, that the bandwidth of a formant as measured at 3 db below the peak amplitude of the formant is generally constant, the width being about 100 c./s., irrespective of the center frequency of the formant. It is therefore necessary, in order to attain a closer approximation to a desired vowel, to vary the quality factor of each resonator in accordance with the change in the resonance frequency of the resonator. An arrangement for changing the quality factor, however is complicated and inconvenient.

It is also difficult to make the resonance characteristics of a resonator have a desired characteristic in accordance with a formant of a vowel.

It is therefore, an object of this invention to eliminate, by employing non-variable equalizers, the necessity of changing the quality factor of a resonator, thereby enabling with ease and accuracy a vocal synthesizer to reproduce a desired vowel.

Another object of this invention is to make, through use of the non-variable equalizers and also local oscillators having higher output frequencies, the response characteristics of the synthesizer as closely and faithfully similar to the shapes or envelopes of the formants as possible.

According to this invention, there is provided a vowel synthesizer wherein the output frequencies of local oscillators are varied in accordance with respective control signals representing the center frequencies of the formants of a vowel; the frequency-varied outputs are amplitude-modulated with higher harmonics of the pitch of the vowel, said higher harmonics being generated by a harmonics generator in response to a control signal representing said pitch; the modulated out puts are made to pass through respective equalizers having characteristics similar to the frequency characteristics of the formants; the equalized outputs are demodulated, and the demodulated outputs are added altogether.

The above-mentioned and other features and objects of this invention and the manner of attaining them will become more apparent and the invention itself will be best understood, by reference to the following description of an embodiment of the invention taken in conjunction with the accompanying drawings wherein:

FIG. 2 shows an example of a formant of a vowel;

FIGS. 4(a)–4(d) show frequency spectra of signals at various parts of the synthesizer.

Figure 1:
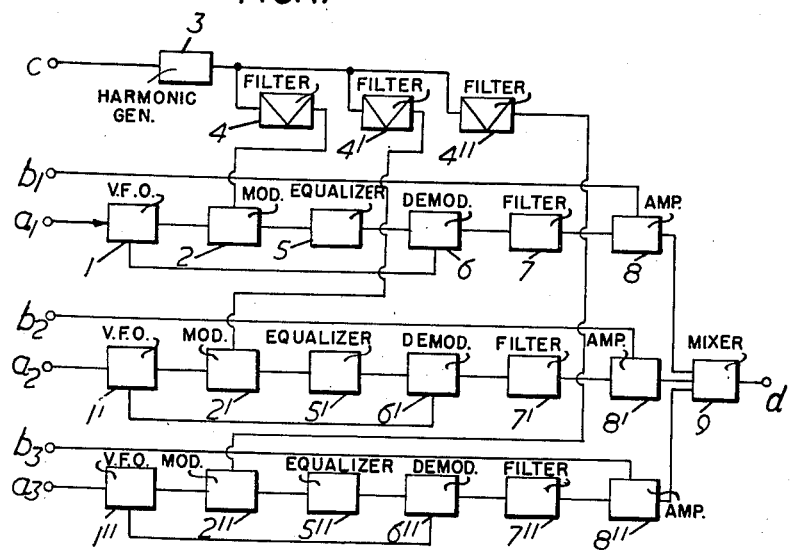
FIG. 1 is a block diagram showing an embodiment of this invention.

Referring now to FIG. 1 there is shown a device of this invention for synthesizing a vowel having formants as shown in FIG. 2, which shows, by way of example, the frequency spectrum of the first formant of the vowel, the spectrum being composed of higher harmonics of the vocal pitch. To input terminals $a_1$, $a_2$, and $a_3$ of the device are sent control signals representing the center frequencies $F_1$, $F_2$, and $F_3$ of the first, second, and third formants of a vowel. It is to be understood that "center frequency" of a formant means the frequency which has the maximum energy in the spectrum of the formant or the frequency which divides the total energy of the spectrum of the formant into upper and lower frequency portons of equal energy, throughout the specification and the appended claims. Into input terminals $b_1$, $b_2$, and $b_3$ are sent control signals representing the intensities of the formants. Into an input terminal $c$ is sent a control signal representing the pitch of the vowel. Inasmuch as reproduction of formants is not substantially different from one another among the first, second, and third formants, reproduction of the first formant only will be described hereunder.

A local oscillator 1 is set into operation by the signal representing the center frequency $F_1$ of the first formant and produces a sinusoidal output oscillation the frequency of which is $f_1+F_1$, $f_1$ being the center frequency of an equalizer to be described later, being chosen higher as compared with the frequency $F_1$ and being, for instance, several kilocycles per second. Alternatively, the frequency of the output oscillation may be $f_1-F_1$. Such a local oscillator, wherein the output frequency is variable in response to a control signal applied thereto, and furthermore wherein the output amplitude is substantially constant all over the frequency range concerned, may easily be made by those skilled in the art, insofar as the variation of the output frequency, namely $F_1$, is small as compared with the general output frequency of the oscillator, namely approximately $f_1$. The output of the local oscillator 1 is fed as a carrier wave to an amplitude modulator 2 that may generally be a conventional balanced modulator.

In the meantime, a harmonic generator 3 generates, in compliance with the control signal representing the pitch of the vowel, an output which comprises higher harmonics of the pitch. The output of the harmonics generator 3 shall preferably contain the higher harmonics in equal amount and may be a series of pulses the repetition frequency of which is equal to the pitch. The output of the harmonic generator 3 is fed through a band-pass filter 4 to the modulator 2 to amplitude-modulate thereat the carrier wave having the frequency $f_1+F_1$. The harmonic generator 3 of the character described is already known to the art and will require no further explanation. The band-pass filter 4 which may be dispensed with is destined to let such higher harmonics of the pitch to pass therethrough that will contribute to the first formants of the vowels being considered. The filter 4 for the first formant may equally well be a low-pass filter. The spectrum of the output signal of the filter 4 is, as shown in FIG. 4(a), composed of higher harmonics of the pitch frequency. The frequency distribution of the modulated output of the modulator 2 is shown in FIG. 4(b). As shown, the modulated output has a center frequency of $f_1+F_1$ and upper and lower side bands.

Figure 3:
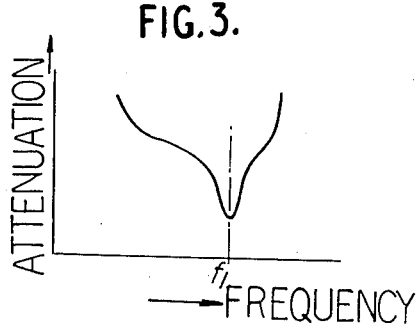
FIG. 3 shows frequency characteristics of an equalizer used in the vowel synthesizer shown in FIG. 1.

The modulated output of the modulator 2 is sent to an equalizer 5. The equalizer 5 is designed to have attenuation frequency characteristics as shown in FIG. 3 and have a center frequency $f_1$. As is apparent from FIGS. 2 and 3, the attenuation characteristics are made similar to the shape or envelope of the first formants of the vowels being considered, which is substantially independent of the timbers of the vowels. An equalizer having such characteristics is known to the art and may be manufactured without much difficulty. The center frequency of the equalizer $f_1$ may have any value higher than the highest frequency of the first formant of the vowels concerned and may be such that enables the simple and easy design of the local oscillator 1 and the equalizer 5. As shown in FIG. 4(b) by dotted lines, the frequency characteristics of the attenuation provided by the equalizer 5 is within the frequency range of the modulated output of the modulator 2.

The output of the equalizer 5, the frequency distribution of which is shown in FIG. 4(c) is then fed to a demodulator 6 for demodulation by the sinusoidal output of the local oscillator 1 having the frequency $f_1+F_1$. The output of the demodulator 6 has a spectrum distribution as shown in FIG. 4(d) and comprises a center frequency $f_1+F_1$, the upper side band component U, and the lower side band component L.

The demodulated output of the demodulator 6 is then sent through a low-pass filter 7 to an amplifier 8 to which the control signal representing the intensity of the first formant is applied to adjust the relative gain of the similar amplifiers 8, 8', and 8" so that they may comply with the relative amplitudes of the formants of the specific vowel. As is understood, the center frequency in the frequency spectrum of the output of the low-pass filter 7 has a center frequency of $f_1+F_1-f_1=F_1$ and composed of frequency components which are equal to the pitch of the specific vowel and integral multiple thereof and the envelope of which is determined by the attenuation characteristics of the equalizer 5 which characteristics in turn are substantially similar to the shape of the first formant.

It will now be appreciated from the foregoing that the outputs of the amplifiers 8, 8', and 8", when mixed altogether at a mixer 9, will produce a vowel at an output terminal d.

It is to be understood that the foregoing description of specific embodiment of this invention is not to be considered as a limitation on its scope.

We claim:
1. A device for synthesizing vowels from signals representative of the pitch and formants characteristics comprising: means for generating higher harmonics of the pitch, in response to a signal representative of the pitch; a plurality of circuits equal in number to the predetermined number of formants to be utilized, each circuit comprising a variable frequency oscillator for generating in response to a signal representative of a formant center frequency, a higher predetermined frequency plus or minus said center frequency, means connected to said variable frequency oscillator and said harmonics generating means for amplitude modulating the oscillation with selected of said harmonics, an equalizer having a fixed center frequency equal to said predetermined frequency and fixed frequency attenuating characteristics proportional to a formant, connected to said modulator, and means connected to said equalizer and said oscillator for demodulating the attenuated output of said equalizer; and a mixer coupled to the demodulating means of all said circuits for adding the outputs thereof to form the vowel.

2. A device for synthesizing vowels as claimed in claim 1 in which the means for amplitude modulating the oscillation with selected of said harmonics comprises an amplitude modulator and a filter.

3. A device for synthesizing vowels as claimed in claim 2 in which the amplitude modulator is a balanced modulator.

4. A device for synthesizing vowels as claimed in claim 1 further comprising a variable amplifier in each circuit coupled to the demodulating means for amplifying the formant in response to a signal representative of the formant intensity.

References Cited in the file of this patent

UNITED STATES PATENTS

| | | |
|---|---|---|
| 2,553,610 | Singleton | May 22, 1951 |
| 2,819,341 | Barney | Jan. 7, 1958 |
| 2,824,906 | Miller | Feb. 25, 1958 |
| 2,938,079 | Flanagan | May 24, 1960 |